United States Patent
Klebel

[15] 3,641,309
[45] Feb. 8, 1972

[54] APPARATUS FOR WELDING THIN METAL SHEETS

[72] Inventor: Wolfram Klebel, Isernhagen HB, Germany

[73] Assignee: Kabel-und Metallwerke Gutehoffnungshutte Aktiengesellschaft, Hannover, Germany

[22] Filed: Aug. 19, 1970

[21] Appl. No.: 65,106

[30] Foreign Application Priority Data

Aug. 27, 1969 Germany.....................P 19 43 443.6

[52] U.S. Cl..........................219/123, 219/60 R, 219/125 R
[51] Int. Cl..........................................................B23k 9/08
[58] Field of Search..............219/122, 123, 124, 125 R, 126, 219/137, 60 A, 60 R, 61

[56] References Cited

UNITED STATES PATENTS

| 2,061,671 | 11/1936 | Riemenschneider | 219/124 |
| 571,463 | 11/1896 | Thompson | 219/123 X |
| 1,792,243 | 2/1931 | Richter | 219/123 X |
| 1,787,600 | 1/1931 | Strobel | 219/123 |
| 3,511,964 | 5/1970 | Polyakov et al. | 219/124 X |
| 2,299,679 | 10/1942 | Casner | 219/123 |

OTHER PUBLICATION

Holt, R. W., Method of Controlling Arc Blow, The Welding Engineer, April 1931

Primary Examiner—J. V. Truhe
Assistant Examiner—L. A. Schutzman
Attorney—Philip G. Hilbert

[57] ABSTRACT

Apparatus for welding a longitudinal seam in thin metal sheets, including a plurality of welding electrodes arranged in a row and in alignment with the seaming portions of the metal sheets, the electrodes being adapted to be singly and collectively adjusted in directions vertically and transversely related to the seam, together with means for stabilizing the operation of the individual electrodes by providing an endless magnetic field disposed about the arcing end portions of the electrodes.

3 Claims, 2 Drawing Figures

PATENTED FEB 8 1972 3,641,309
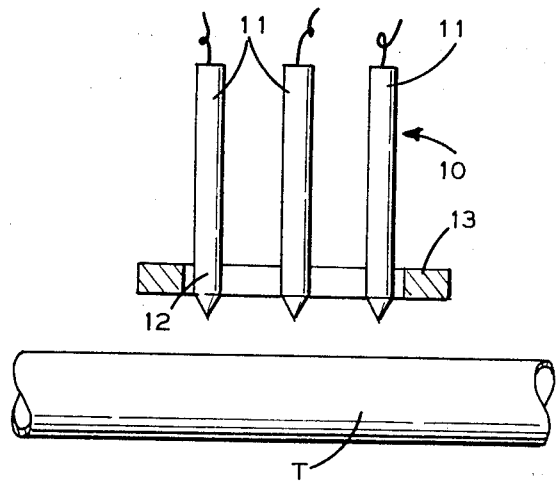
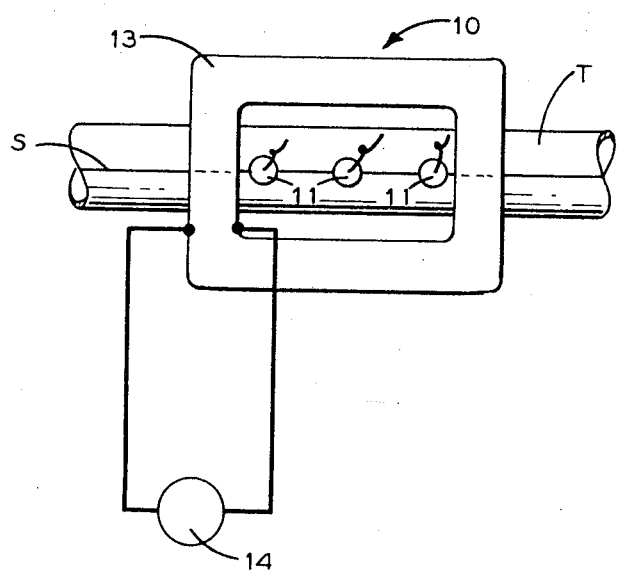
INVENTOR.
Wolfram Klebl
BY
ATTORNEY

APPARATUS FOR WELDING THIN METAL SHEETS

There is disclosed in application Ser. No. 720,504 filed Apr. 11, 1968 now Pat. No. 3,544,752, apparatus for welding a longitudinal seam in thin metal sheets. More particularly, such apparatus comprises a plurality of welding electrodes arranged in a row for alignment with the seam to be welded, as in thin metal tubing formed from a thin metal tape shaped to tubular form with the side edges thereof adjacent each other for forming the welded seam.

In such apparatus, the electrodes are arranged for individual or collective adjustment in directions vertically or transversely related to the seam, in order to obtain a precise longitudinal welded seam. The electrodes are of the nonconsumable type and the welding operation takes place under a protective inert gas atmosphere.

An object of this invention is to provide in a multiarc seam welding apparatus of the character described improved means for stabilizing the arcs of the individual electrodes to prevent any one arc adversely affecting the operation of the other electrodes.

Another object of this invention is to provide in a welding apparatus of the character described means for forming an endless magnetic field which extends about the arcing end portions of the welding electrodes, which field is effective to stabilize the individual resultant arcs and to prevent one arc from influencing another arc in a manner to laterally displace the other arc from its vertical direction.

Still another object of this invention is to provide in welding apparatus of the character described, a winding extending about the lower ends of the welding electrodes and energized from a constant current source to provide a stabilizing magnetic field.

Other objects of this invention will in part be obvious and in part hereinafter pointed out.

DESCRIPTION OF THE DRAWING

In the drawing,

FIG. 1 is a side elevational view showing a multiarc welding apparatus embodying the invention; and FIG. 2 is a plan view thereof.

DESCRIPTION OF THE PREFERRED EMBODIMENT

As shown in the drawing, 10 designates a multiarc seam welding apparatus embodying the invention. The same comprises a row of longitudinally spaced individual welding electrodes 11 having lower welding tips 12. Such apparatus is particularly adapted to weld seams in thin metal sheets, such as the longitudinal seam S in thin metal tubing T formed by converting a thin metal tape to tubular form and bring the side edges thereof in adjacent relation to form seam S, as by suitably moving tubing T in a longitudinal path past the welding apparatus 10.

The welding electrodes 11 are arranged for single or collective adjustment in directions vertically and transversely related to the path of seam S in tubing, as detailed in application Ser. No. 720,504.

It has been found that the individually energized electrodes 11 may adversely affect the operation of each other, as by effecting a lateral displacement of the vertically extending arc from any one of the electrodes 11.

Accordingly, there is provided means for stabilizing the operation of the electrodes 11. To this end, there is provided an endless winding 13 which extends about the lower arcing portion 12 of electrodes 11; the winding 13 being energized by a constant current source 14.

Thus, it has been found that the resultant magnetic field produced by energized winding 13, is highly effective in maintaining the true vertical direction of the arcs emenating from electrode tips 12, without any lateral displacement thereof. Thus, precision welding of the seam S in tubing T, is assured.

The winding 13 preferably has a number of ampere turns equal to the sum of the welding current valves of electrodes 11. Thus, with each electrode 11 carrying a current of 200–250 amperes; the winding 13 will have about 600–750 ampere turns.

I claim:

1. Apparatus for welding a longitudinal seam in moving thin metal sheets, comprising a row of longitudinally spaced, individually energized welding electrodes, said electrodes being disposed for alignment with said seam and being arranged for respectively individual and for collective adjustment in directions vertically and transversely related to said seam, and means for stabilizing the resultant welding arcs to prevent the operation of any one arc from adversely affecting the operation of the other arcs, said means comprising means providing an endless magnetic field extending about the perimeter of a zone encompassing the longitudinally spaced arcing end portions of said electrodes.

2. Apparatus as in claim 1 wherein said stabilizing means comprises an endless winding and a source of constant current in circuit with said winding.

3. Apparatus as in claim 2 wherein said winding has a number of ampere turns substantially equal to the sum of the welding currents supplied to the respective electrodes.

* * * * *